United States Patent
Dierolf et al.

(10) Patent No.: US 11,175,163 B2
(45) Date of Patent: Nov. 16, 2021

(54) METHOD AND APPARATUS FOR CALIBRATING AN ACTUATOR SYSTEM

(71) Applicant: Robert Bosch GmbH, Stuttgart (DE)

(72) Inventors: Simon Dierolf, Owen (DE); Udo Sieber, Bietigheim (DE); Tobias Mauk, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 427 days.

(21) Appl. No.: 16/306,089

(22) PCT Filed: May 29, 2017

(86) PCT No.: PCT/EP2017/062840
§ 371 (c)(1),
(2) Date: Nov. 30, 2018

(87) PCT Pub. No.: WO2017/207459
PCT Pub. Date: Dec. 7, 2017

(65) Prior Publication Data
US 2019/0137303 A1 May 9, 2019

(30) Foreign Application Priority Data

May 31, 2016 (DE) ...................... 10 2016 209 366.5

(51) Int. Cl.
*G01D 18/00* (2006.01)
*F02D 11/10* (2006.01)
(Continued)

(52) U.S. Cl.
CPC ........... *G01D 18/001* (2021.05); *F02D 9/105* (2013.01); *F02D 11/10* (2013.01); *F02D 11/106* (2013.01);
(Continued)

(58) Field of Classification Search
CPC ... G01D 5/24452; F02D 11/10; F02D 11/106; F02D 41/2432; F02D 9/105;
(Continued)

(56) References Cited

U.S. PATENT DOCUMENTS

2006/0016427 A1 * 1/2006 Uda ...................... F02D 11/106
123/399
2006/0180413 A1 * 8/2006 Halasy-Wimmer ..........................
B60T 13/741
188/158
(Continued)

FOREIGN PATENT DOCUMENTS

CN 108233812 A * 6/2018
DE 10 2010 063 326 A1 12/2011
(Continued)

OTHER PUBLICATIONS

International Search Report corresponding to PCT Application No. PCT/EP2017/062840 dated Aug. 28, 2017 (German and English language document) (5 pages).

*Primary Examiner* — Joseph J Dallo
(74) *Attorney, Agent, or Firm* — Maginot, Moore & Beck LLP

(57) ABSTRACT

The disclosure relates to an apparatus and a method for adapting control of a brushless electric motor in order to influence a position of an actuator, wherein at least two values of an output variable of a sensor are recorded in order to determine a position of the actuator, an item of information relating to the position of the actuator is determined on the basis of the at least two recorded values, the determined information relating to the position of the actuator is assigned to an item of information relating to a rotor position of the electric motor, wherein the at least two recorded values are recorded at two different times in a predefined interval of time, and wherein a duration of the predefined (Continued)

interval of time is determined on the basis of a characteristic of the electric motor.

15 Claims, 2 Drawing Sheets

(51) Int. Cl.
    *F02D 41/24*     (2006.01)
    *F02D 9/10*     (2006.01)
    *F02M 26/48*     (2016.01)
    *F02M 26/54*     (2016.01)

(52) U.S. Cl.
    CPC ..... *F02D 41/2432* (2013.01); *F02D 41/2464* (2013.01); *F02M 26/48* (2016.02); *F02M 26/54* (2016.02); *F02D 2250/14* (2013.01)

(58) Field of Classification Search
    CPC . F02D 41/2464; F02D 2250/14; F02M 26/48; F02M 26/54
    See application file for complete search history.

(56) References Cited

U.S. PATENT DOCUMENTS

| | | | |
|---|---|---|---|
| 2011/0001444 A1 | 1/2011 | Krause et al. | |
| 2013/0154539 A1* | 6/2013 | Grossmann | G05B 15/02 |
| | | | 318/638 |
| 2014/0152229 A1* | 6/2014 | Grossmann | F02D 41/2464 |
| | | | 318/561 |
| 2016/0102627 A1* | 4/2016 | Schweinfurth | F02D 41/045 |
| | | | 701/103 |
| 2017/0163193 A1* | 6/2017 | Grossmann | G05B 19/00 |
| 2017/0310271 A1* | 10/2017 | Friedrich | H02P 6/085 |
| 2019/0089276 A1* | 3/2019 | Grossmann | H02K 7/116 |
| 2019/0137303 A1* | 5/2019 | Dierolf | F02D 41/2464 |

FOREIGN PATENT DOCUMENTS

| | | | | |
|---|---|---|---|---|
| DE | 10 2013 209 624 A1 | 11/2014 | | |
| DE | 10 2015 205 772 B3 | 4/2016 | | |
| DE | 102016209366 A1 * | 11/2017 | | F02D 41/2432 |
| EP | 1911951 A1 * | 4/2008 | | F16K 27/0218 |
| EP | 2 128 408 A2 | 12/2009 | | |
| WO | WO-2010003851 A * | 1/2010 | | H02K 29/08 |

* cited by examiner

METHOD AND APPARATUS FOR CALIBRATING AN ACTUATOR SYSTEM

This application is a 35 U.S.C. § 371 National Stage Application of PCT/EP2017/062840, filed on May 29, 2017, which claims the benefit of priority to Serial No. DE 10 2016 209 366.5, filed on May 31, 2016 in Germany, the disclosures of which are incorporated herein by reference in their entirety.

BACKGROUND

The disclosure relates to a method and an apparatus for calibrating a positioner system.

Positioners, in particular those in motor vehicles, comprise a brushless electric motor, a transmission and an actuating element, the position of which is set by an electric motor and by means of the transmission, and a sensor for ascertaining a position of the positioner or of the actuating element. An example of a positioner of this kind is a throttle valve actuator. Other actuators, such as actuators for operating electronically controlled clutches for example, also comprise positioners of this kind.

The correct position of the actuating element is first checked by the sensor. As a result, monitoring is performed as to whether the activated position of the positioner also corresponds to the actual actuating position of the actuating element. Secondly, on the basis of the actual position recorded by the sensor, position control of the actuating element is carried out by way of the measured actual position being adjusted in comparison to a prespecified setpoint position.

Brushless electric motors are electronically commutated and therefore require external commutation. In this case, a rotation angle of a space vector corresponds to a position of an actuating element. The current rotor position depends on the space vector. To this end, it is necessary to know the rotor position of the electric motor. A method for operating a positioner comprising a brushless electric motor is known from DE 10 2010 063 326 A1.

For the purpose of reliable operation of the motor, basic adaptation or calibration is required here, this being known from the prior art. During this basic adaptation or calibration, the rotor position of the motor is established, so that the commutation of the motor then functions reliably. To this end, the actuating element is, for example in a known manner, moved between two positions and, at defined times, data pairs comprising the recorded actuating element position and the space vector applied at this time are determined for the commutation of the stator of the motor. This passage can, for example, also be repeated twice or generally several times, for example at different amplitudes of the space vector, this then producing different trailing angles between the space vector position and the rotor position. The rotor position of the motor can then be determined by model-based calculation or on the basis of mathematical relationships, as are described in DE 10 2010 063 326 A1 for example.

In other words, conclusions can be drawn about the rotor position by recording space vector positions and the associated actual positions of the actuating element using premises for various positions of the space vector or of the actuating element. From this, a characteristic map or a characteristic curve can then be obtained or created by way of the associated rotor position or that which represents this relationship being stored, for example, for actual positions of the actuating element. Therefore, for the operation of the motor, that is to say for its commutation, conclusions can be drawn, after the basic adaptation, about the rotor position from the values of the actual position of the actuating element with the aid of the characteristic map or the characteristic curve and the space vector which is required for reaching a setpoint value of the actuating element can be set at the stator.

SUMMARY

Methods of this kind for basic adaptation or calibration are used, for example, in throttle valves or similar actuators. In practice, only a very limited time budget is available for the basic adaptation. This means that the passage for the basic adaptation has to be completed in a very short time, for example less than 3 seconds. Owing to the rapid passage, the actuating element is caused to oscillate, for example by motor ripple. These oscillations are prespecified, for example, by the motor characteristic. In this case, the motor can be simply regarded as a circular path on which there are "unevennesses". These "unevennesses" are arranged at a fixed distance from one another when viewed spatially. When passing through the circular path, that is to say during rotation of the space vector and of the rotor, these "unevennesses" are then passed and the motor is caused to oscillate, these oscillations being transmitted to the actuating element. If the circular path is passed through at double the speed, the time interval in which the "unevennesses" are traversed is halved. Therefore, the frequency of the oscillation then also doubles.

In this case, these oscillations are to be understood such that the rotor and therefore the actuating element leads or trails the setpoint value, that is to say the actual position of the actuating element, apart from in oscillation nodes, does not have to correspond to the oscillation-free state. It may be the case here that the oscillations turn out to be greater, that is to say have higher amplitudes, the faster the motor rotates, that is to say the higher the frequency of the space vector.

On account of the limited time budget for the calibration, when recording the data pairs it is not possible to wait for the oscillations to die down and it is not possible to move at a slow enough speed to keep the amplitude of the oscillations low. Instead, in practice, it may be necessary to select a high movement speed or rotation speed of the motor. This can result in the actual ideal line not being recorded in the data pairs comprising space vector, space vector angle and actuating element position detected at different times, but rather in, for example, the actuating element positions being corrupted by the oscillations which are impressed onto the ideal line. In other words, the recorded value of the actuating element position can be too large or too small compared with the ideal value which would have been produced if the oscillation had died down. As a result, the basic adaptation or calibration can be corrupted.

The object of the present disclosure is therefore to provide a calibration method and calibration system or basic adaptation method and basic adaptation system for a positioner having an electronically commutated electric motor, which method can be completed in a short time and by way of which method a characteristic curve or a characteristic map can nevertheless be determined with a high degree of accuracy, that is to say by way of which the above disadvantage can be avoided.

This object is achieved by the method disclosed herein and also by the apparatus and the computer program product disclosed herein.

The basic concept of the disclosure here is to provide a method for basic adaptation, calibration or for assisting in the calibration, by way of which method the basic adaptation or calibration can be carried out in a very short time and during which method the accuracy of the data values which are required for the basic adaptation or calibration is improved at the same time by way of the influence of oscillations of the system being reduced.

To this end, the disclosure provides a method for a positioner system which comprises a brushless electric motor for influencing a position of an actuating element, in which method at least two values of an output variable of a sensor are recorded for determining a position of the actuating element, an item of information relating to the position of the actuating element is ascertained depending on the at least two recorded values, the ascertained item of information relating to the position of the actuating element is assigned to an item of information relating to a rotor position of the electric motor, wherein the at least two recorded values are recorded at two different times in a prespecified time interval, and wherein a duration of the prespecified time interval is determined depending on a characteristic of the electric motor.

The proposed method has the advantage that interpolation points which are ascertained at fixed times are replaced by interpolation points which are produced from at least two values in a time interval which comprises the replaced time. At least two values and at least two recorded values also means that considerably more than two of these values can be used. This increases the degree of accuracy. In this case, a time during the basic adaptation corresponds to a rotation angle value of a space vector which rotates at a known angular velocity. The description in respect of time period serves merely for better understanding. For example, the position value of an actuating element originally ascertained at time 500 ms is replaced by a value which is produced by several positions of the actuating element which are produced in a time interval, for example, of from 470 ms to 530 ms. By way of example, 6 positions of the actuating element are ascertained at times 475 ms, 485 ms, 495 ms, 505 ms, 515 ms and 525 ms. These 6 position values are assigned to an average value, for example in an arithmetically averaged manner. This average value is then assigned, as actuating element position, to the interpolation point for 500 ms. In this case, the interval width (here 60 ms) is prespecified, for example, by the wavelength of the dominant harmonic of the impressed oscillation, so that a complete wavelength of the dominant harmonic is "sampled" over the time interval. The extent of the deviation from the oscillation-free ideal line is reduced owing to this determination of the position value of the actuating element from at least two values within the time interval.

The extent of the oscillation is reduced by positive values and negative values within a wavelength compensating one another during the oscillation. Therefore, the recorded at least two values are preferably at least approximately uniformly distributed over the time interval.

The ideal line can be represented, for example, in a coordinate system in which time, and therefore the rotation angle of the space vector with which the stator of the motor is commutated, as a result of which the rotor follows the generated magnetic field of the stator, is plotted on the X axis. The position of the actuating element or of the transmission, which position is recorded by the sensor, is then plotted on the Y axis. A "smooth" curve can then be produced in an ideally oscillation-free system. If, however, oscillations are impressed onto the system owing to motor ripple for example, these oscillations are superimposed onto the ideal line.

A large number of position values is preferably used within the time interval for the purpose of determining the position value of the actuating element. At least 5 position values are particularly preferably determined or recorded within the time interval. The position values are particularly preferably distributed at least approximately uniformly, that is to say spaced apart equidistantly, within the time interval.

The electric motor is advantageously activated at a prespecified first speed for moving the actuating element in a first operating state of the electric motor and at a prespecified second speed for moving the actuating element in a second operating state of the electric motor, wherein the prespecified first speed is higher than the prespecified second speed, and the electric motor is activated for operation in the first operating state or in the second operating state depending on the item of information relating to the position of the actuating element. The speed is the angular velocity at which the rotor or the space vector is moved. In this case, greater motor ripple is generated at a relatively high speed than at a relatively low speed. An appropriate speed by way of which a degree of accuracy which is required for the calibration is achieved can be set by the two operating states, depending on the position of the actuating element. The different speeds therefore allow activation to be matched to the requirements of the calibration.

The item of information relating to the position of the actuating element is advantageously ascertained in at least one prespecified time interval by averaging over several measurement values which were measured in the at least one prespecified time interval. As a result, the error is reduced and the calibration is improved.

The duration of the time interval advantageously depends on the wavelength of a periodic oscillation around the ideal curve which occurs during activation of the rotor. As a result, the influence of the motor ripple is taken into account as the characteristic of the electric motor.

The rotor is advantageously activated at a uniform angular velocity. As a result, the angular velocity is constant. This simplifies the calibration.

A position of the actuating element can advantageously be set by activating the electric motor, wherein the position of the actuating element is changed in the first operating state of the electric motor in a first region which is delimited by a prespecified first stop for the actuating element and a prespecified first position of the actuating element, which first position is different from said first stop. A stop is, for example, a maximum deflection of the actuating element from an inoperative position which corresponds to the prespecified first position.

While the position is changed in the first region, times for recording measurement values by the sensor are advantageously provided in at least 50%, in particular at least 60%, of the first region. As a result, for example, the interfering effects are reduced in a sufficiently large region between the stop and the inoperative position of the actuating element.

The position of the actuating element is advantageously changed in the second operating state of the electric motor in a second region which is delimited by a prespecified second stop for the actuating element and the prespecified first position of the actuating element which is different from said second stop. As a result, a second region, which is different from the first region, is taken into account up to a second maximum deflection of the actuating element.

The first region and the second region are passed through at a different speed from one another. As a result, it is possible to take into consideration the special features in respect of accuracy and time budget. In particular, the calibration can therefore be carried out at a high speed with a sufficiently high degree of accuracy in one of the regions and with a high degree of accuracy and at a sufficiently high speed for the entire time budget in the other of the regions.

A reduction in the first speed or the second speed is advantageously provided before the actuating element reaches a prespecified stop. As a result, the stop is reached at a reduced speed even in the case of a high speed. This protects the actuating element and the stop.

The first speed is advantageously constant in at least 90% of the first region and/or the second speed is constant in at least 90% of the second region. As a result, the angular velocity is constant in a region which is large enough for the calibration. This simplifies the calibration.

The actuating element is advantageously a throttle valve, and the first position of the actuating element is an emergency-air position of the throttle valve.

The duration of the prespecified time interval is advantageously prespecified depending on the duration of an interval of an oscillation of the output variable, in particular in the range of between 0-200 milliseconds. As a result, a time interval which is particularly advantageous for the calibration is prespecified.

Further advantageous refinements of the present disclosure are specified in the further embodiments disclosed herein.

BRIEF DESCRIPTION OF THE DRAWINGS

Preferred embodiments of the present disclosure will be explained in more detail below with reference to the appended drawings, in which.

DETAILED DESCRIPTION OF EMBODIMENTS

Figure 1:
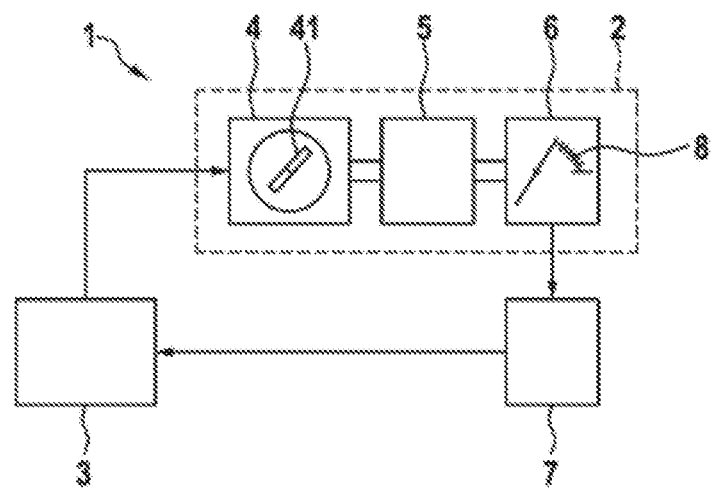
FIG. 1 shows a schematic illustration of a positioner system.

FIG. 1 shows a positioner system 1 having a positioner 2 which is activated by a controller 3.

The positioner 2 comprises an electric motor 4 which has an electronically commutated, that is to say brushless, electric motor, such as a synchronous motor, an asynchronous motor or the like for example. This actuating drive 4 has an output shaft which is coupled to a transmission 5. The transmission 5 is further coupled to an actuating element 6. The actuating element 6 is, in a manner activated by the controller 3, shifted to prespecified positions, that is to say in particular moved or adjusted to prespecified positions. In the process, a solid angle is set at the electric motor 4, said solid angle being assigned to a rotor position of the rotor 41. A spring 8 holds the actuating element 6 in an inoperative position in the example.

A sensor 7 is arranged on the actuating element 6 or alternatively on the transmission 5. An actuating movement or a position of the actuating element 6 can be recorded with the aid of the sensor 7. The position of the actuating element 6 therefore corresponds to information relating to the current position of the actuating element 6. An indication relating to the recorded position of the actuating element 6 is transmitted to the controller 3. By way of example, the sensor 7 can have a GMR sensor (GMR: Giant Magnetic Resistance), a Hall sensor or the like. As an alternative, optical methods can also be used. By way of example, a detector voltage can be provided to the controller 3 as the position indication, said detector voltage digitizing the position indication, for example with the aid of an analog/digital converter, before further processing.

A current position of a rotor 41 of the electric motor 4 is ascertained from the current position of the actuating element 6 by means of a characteristic curve. This item of information is used for activating the electric motor 4, in particular in order to set a setpoint position of the actuating element 6. As is stated further above, the characteristic curve can be ascertained by a calibration method or a basic adaptation method.

Positioners 2 of this kind are used, for example, in motor vehicles, for example in throttle valves, exhaust gas return valves, charging movement valves, electronically controlled clutches and numerous similar components. In particular, positioners 2 of this kind are used where the correct actuating movement of the positioner 2 is essential to functioning and therefore has to be checked with the aid of the additional sensor 7.

In this case, the position indication of the sensor 7 is dependent on the output variable of the sensor 7. In the example, the output voltage of the sensor 7 changes depending on the position of the actuating element 6 recorded by the sensor 7.

Disadvantageously, the actual rotor speed is caused to oscillate in the real system. These oscillations lead to oscillations in the output signal of the sensor 7. The oscillation period is dependent on the movement speed and therefore on the electrical angular frequency of the motor activation means.

Figure 2:
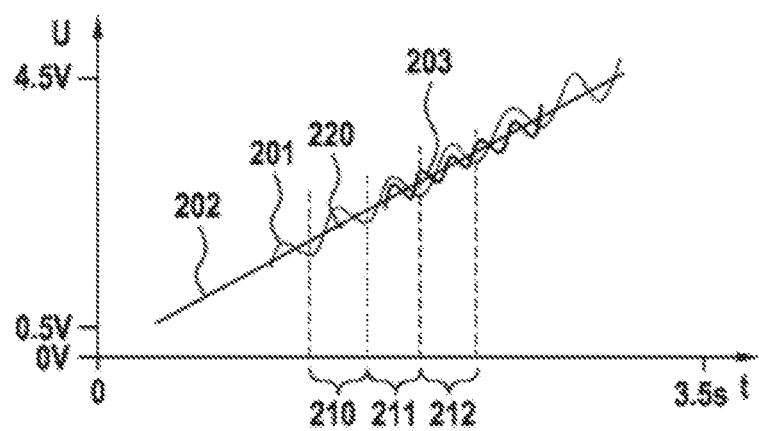
FIG. 2 shows a graph for illustrating the oscillation of an output variable of a sensor.

FIG. 2 shows a graph for illustrating the oscillation of the output variable of the sensor 7, wherein the oscillations are impressed, as a deviation from the ideal line, for example as a result of motor ripple, onto the overall system and are therefore also reflected in the sensor signal. The output variable is a sensor output voltage U, for example between 0.5 V and 4.5 V. The output variable depends on the position of the actuating element 6. As illustrated in FIG. 2, the output variable of the sensor 7 increases over time. This corresponds to a change in the position of the actuating element 6 which, in the example, is intended to take place in a linear manner at a constant speed. This is illustrated as the idealized straight line 202 in FIG. 2.

FIG. 2 can show, for example, the passage of the actuating element 6 during the process or during the method of a basic adaptation or a calibration. Processes or methods of this kind are used, for example, in throttle valves or similar actuators. In practice, only a very small time budget is available for the basic adaptation. This means that the passage for the basic adaptation has to be completed in a very short time, for example less than 3 seconds or even only less than 1.5 seconds. Owing to the rapid passage, the actuating element 6 is caused to oscillate, for example by motor ripple, said oscillations then being recorded by the sensor 7. It is not possible when recording the data pairs comprising space vector or space vector angle and the position of the actuating element 6 to wait for the oscillations to die down. As a result, it is possible for the actual idealized straight line 202 to not be recorded in the data pairs comprising space vector or space vector angle and actuating element position recorded at different times, but rather for, for example, the actuating element positions to be corrupted by the oscillations 201, 203 which are impressed onto the idealized straight line 202. In other words, the recorded value of the actuating element position can be too large or too small compared with the ideal value which would have been produced if the oscillation had died down. As a result, the basic adaptation can be corrupted, as a result of which an inaccurate characteristic curve for the subsequent operation of the actuating element can be produced.

FIG. 2 illustrates, in sections, the time profile 201 of the sensor output voltage U. Said figure likewise illustrates an ideal profile which corresponds to the straight line 202. In the example, the sensor output voltage U oscillates periodically about the straight line 202 which characterizes the ideal profile. The amplitude, the frequency and the phase position of the oscillation are dependent on the positioner system 1 and the activation of said positioner system. In this case, the oscillation is made up of harmonic oscillation components. FIG. 2 illustrates the fundamental 201 and merely by way of example a harmonic 203 of higher order which, however, does not represent the dominant harmonic on account of the smaller amplitude. The fundamental 201 and primarily the higher harmonic 203 are illustrated only in sections in FIG. 2 for reasons of clarity.

For illustration purposes, it is assumed in FIG. 2 that the superimposed oscillation corresponds substantially to the fundamental 201, that is to say the higher harmonics played no role. It then follows that the motor experiences, for example, a rotation of the rotor along a wavelength of the fundamental 201. In the simplified picture described further above, the "circular path" has therefore been passed through once within a wavelength of the fundamental 201. By way of example, for illustration, the intersection points of the superimposed oscillation, here approximately the fundamental 201, with the ideal profile of the straight line 202 can be taken into consideration. Intersection points which are adjacent to one another are therefore at the same distances on the Y axis, which describes the actual position of the actuating element 6 and therefore indirectly also the rotor position, irrespective of the movement speed. The rotor 41 is fixedly coupled to the actuating element 6 by means of the transmission 5.

In this case, the frequency of that harmonic with the largest amplitude identifies a dominant harmonic oscillation as a characteristic property of the electric motor 4. If several harmonics have similarly high amplitudes, it is also possible to refer to several dominant harmonics. The fundamental 201 with a frequency f can be called the first harmonic. In this case, the fundamental 201 has the longest wavelength, that is to say the greatest distances along the Y axis between successive periods. However, in respect of time period, that is to say along the X axis of FIG. 2, the time interval for passing through one period of the fundamental is longer than the time interval for passing through one period of the second harmonic with the frequency 2*f, and this is longer than the time interval for passing through one period of the third harmonic with the frequency 3*f etc. In the example, the fundamental 201 has the largest amplitude. The fundamental 201 therefore determines substantially the periodic interference in this example. In the example, owing to the only low amplitude of the second harmonic 203, the time profile of the sensor output voltage U with respect to the ideal profile 202 is approximately identical to the fundamental 201.

For reasons of construction, the wavelength of the dominant harmonic oscillation of the output variable of the sensor 7 is determined as the characteristic of the electric motor 4 for the positioner system 1 with a known electric motor 4.

The frequencies and therefore the wavelengths of the oscillations caused can be prespecified, for example, for reasons of construction, so that a large number of complete actuating elements 6 of a series also always has the same dominant harmonic oscillation. The picture of the circular path described above defines, for reasons of construction, the number of "unevennesses" the circular path has, the height of the "unevennesses" and the distance at which said unevennesses are arranged in relation to one another.

In order to avoid errors in the activation, the characteristic curve, which assigns the output variable of the sensor 7 to the actual value of the rotor 41, that is to say the rotor position, of the electric motor 4, is calibrated or created. This is carried out during the calibration or the basic adaptation.

To this end, the controller 3 is designed to use this characteristic curve for activating the electric motor 4 after the calibration or the basic adaptation.

In the example, several sectors 210, 211, 212 are illustrated as successive time intervals in FIG. 2. The wavelength of a multiple of the fundamental 201 of the output variable of the sensor 7, in particular the dominant harmonic oscillation, here the fundamental 201, determines the time length of the sectors 210, 211, 212, that is to say of the time interval on the X axis, in this case. Time intervals last for, for example, 100 milliseconds. The duration of the prespecified time interval is prespecified depending on the duration of an interval of an oscillation of the output variable, in particular between 0 and 200 milliseconds in the example.

An interpolation point 220 for the characteristic curve is illustrated in the sector 210 in FIG. 2. The interpolation point is ideally situated on the ideal profile 202, as illustrated in FIG. 2. The distance between the interpolation points is prespecified, for example, to be constant. The distance is, for example, 100 milliseconds.

As has been described further above, by recording said data pairs, a characteristic curve, which assigns a rotation angle of the space vector and therefore a position of the rotor 41 of the electric motor 4 to the position of the actuating element 6, can then be ascertained using mathematical relationships or by model-based calculation with the conventional method, as illustrated in FIG. 2. This characteristic curve is used to calibrate the positioner system 1, that is to say the characteristic curve is stored in the controller 3 and used for activating the electric motor 4.

As a result, the negative influence of the oscillations on the characteristic curve is reduced.

However, the oscillations can disadvantageously become greater, the faster the rotor 41 or the actuating element 6 passes through the movement path during controlled operation.

Therefore, errors occur when learning the interpolation points in the desired short time which is available for calibration, in particular in motor vehicles.

These errors are minimized by the method described below.

Figure 3:
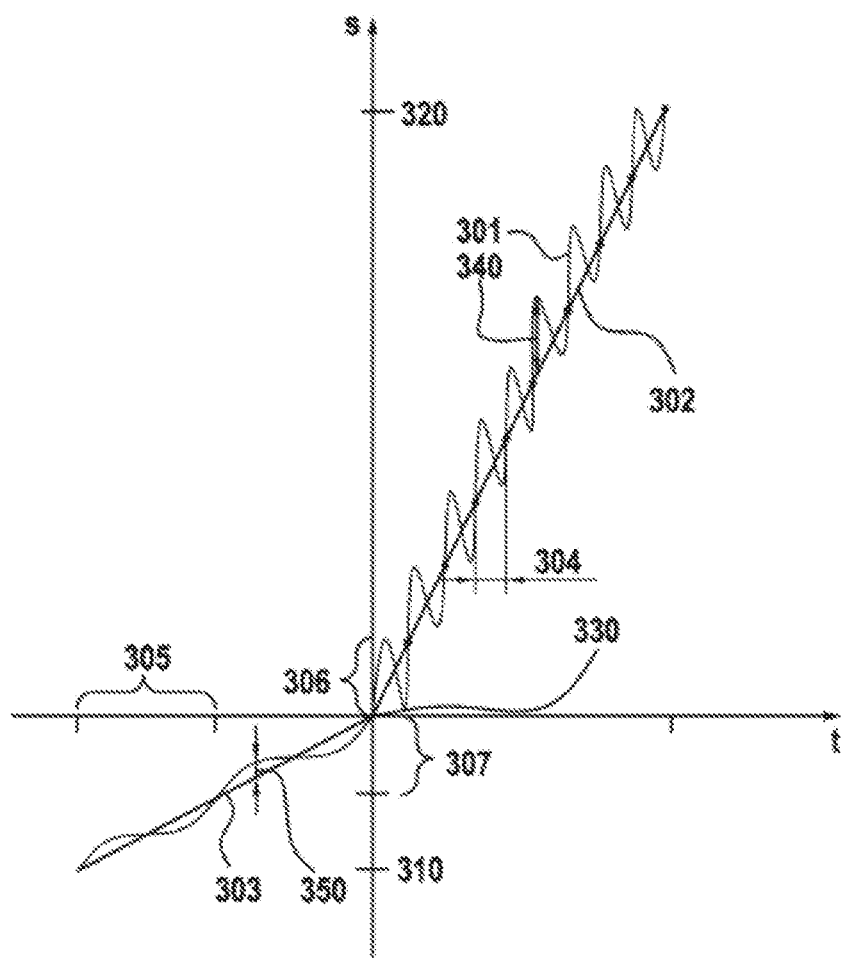
FIG. 3 shows a graph for illustrating a calibration of the positioner system.

In this case, the interpolation point 220 is ascertained by a method, schematically illustrated in FIG. 3, for calibrating the positioner system 1, in which method at least two values of the output variable of the sensor 7 are recorded for determining the position of the actuating element 6.

As long as the amplitudes are low, this being the case at low movement speeds in particular, the oscillations of low amplitude lead to small corruptions. However, at higher movement speeds, oscillations with a considerably larger amplitude occur and lead to large corruptions. An improved method for determining interpolation points is described with reference to FIG. 3.

FIG. 3 illustrates the time profile 301 of the position S of the actuating element 6. Said time profile corresponds to the time profile of the output variable of the sensor 7, that is to say the sensor output voltage U. An ideal profile is illustrated in a first region as a first straight line 302 with a first gradient and in a second region as a second straight line 303 with a second gradient.

In the first region, the time profile 301, as viewed along the X axis, of the position of the actuating element 6 has a first period 304. In the second region, the time profile 301 of the position of the actuating element 6 has a second period 305 which, in the example, is longer than the first period 304.

In this case, the first region, to the right of the Y axis, is, as seen spatially, that is to say in the direction of the Y axis, longer than the second region. In the picture of the "circular path", the circular path has to be passed through more frequently in the first region than in the second region. Only a limited time budget is available for passing through the first region and the second region in the course of the calibration.

In the first region, the profile 301 of the position of the actuating element 6 has a first wavelength 306 along the Y axis. In the second region, the profile 301 of the position of the actuating element 6 has a second wavelength 307 along the Y axis, said second wavelength being the same size as the first wavelength 306 in the example since they have the same dominant harmonic in the example.

In this case, the amplitude of the oscillation in the first region is higher than the amplitude of the oscillation in the second region, that is to say to the left of the Y axis, on account of the higher movement speed. The differences in the movement speeds are clearly shown in the figure by the different gradients of the ideal curves 302, 303. The amplitude in the first region is denoted 340 in FIG. 3. The amplitude in the second region is denoted 350 in FIG. 3.

The objective is then to reduce the influence of the oscillations when rapidly passing through the first region, that is to say to the right of the Y axis, when ascertaining the value pairs, that is to say the space vector position or time on the X axis and the actual position of the actuating element 6 on the Y axis. This is achieved by an actual position of the actuating element 6 for an interpolation point not being recorded merely at points, as in FIG. 2. Instead, a time interval 304 is assigned to each interpolation point, said time interval preferably comprising the interpolation point. In the process, the width of the time interval is given as that width or time length which corresponds to the wavelength of the dominant harmonic of the oscillation. In other words, the width of the time interval is such, as viewed as far as the Y axis, that the dominant harmonic has covered one period. At least two values of the actual position of the actuating element 6 are then recorded within the time interval 304. These at least two values are then combined with one another by calculation, for example arithmetically averaged. This calculated value is then assigned to the interpolation point which is assigned to the time interval and preferably lies in the time interval.

By way of example, the position value of an actuating element 6 which was originally ascertained at the time point 500 ms is replaced by a value which is produced by several positions of the actuating element 6 which are produced in a time interval, for example, of from 470 ms to 530 ms. By way of example, 6 positions of the actuating element 6 are ascertained at the time points 475 ms, 485 ms, 495 ms, 505 ms, 515 ms and 525 ms. These 6 position values are assigned to an average value, for example in an arithmetically averaged manner. This average value is then assigned, as actuating element position, to the interpolation point for 500 ms. In this case, the interval width, here merely by way of example 60 ms, is prespecified, for example, by the wavelength of the dominant harmonic of the impressed oscillation, so that a complete wavelength of the dominant harmonic is "sampled" over the time interval. However, considerably more values can also be ascertained in order to arrive at the calculated value. The greater the number of values recorded within the time interval 304, the less the calculated value deviates from the ideal curve 302. In this case, the values recorded in the time interval are preferably uniformly distributed over the time interval, for example are equidistantly spaced apart.

It may now be the case that the second region is so small, for example in the case of a throttle valve the region from the emergency-air point to the completely closed position, that, in the case of the method just described, too few interpolation points would be able to be recorded in order to obtain a sufficiently accurate and dense characteristic map or a sufficiently accurate and dense characteristic curve. In the illustrated example of FIG. 3, only two intervals would be able to be recorded.

Provision can therefore be made to select the movement speed to be sufficiently slow in the shorter region, so that the amplitudes of the oscillation turn out to be small and therefore a sufficient degree of accuracy can be achieved with the conventional method as has been described in FIG. 2. In other words: the oscillations are so small that the value pairs do not significantly deviate from the ideal line. A high number of interpolation points which are recorded at points can then be recorded in the second region, said interpolation points meeting the requirements in respect of accuracy for the characteristic curve to be determined therefrom.

In order to then manage with the time budget for the calibration, the first, longer region therefore has to be passed through more rapidly. In this longer region, for example from the emergency-air point to the state of a completely open throttle valve, a somewhat greater distance between the value pairs, as viewed along the X axis, is less critical. Therefore, here, the above-described method involving recording several values in the time intervals can be applied around the desired interpolation points.

The time sequence of the basic adaptation or the calibration will now be described using the example of FIG. 3.

The electric motor 4 is activated at a prespecified first speed for moving the actuating element 6 in a first operating state of the electric motor 4 and at a prespecified second speed for moving the actuating element 6 in a second operating state of the electric motor 4. In this case, the prespecified first speed is higher than the prespecified second speed. Accordingly, the first straight line 302 has a higher gradient, which corresponds to the first speed, than the second straight line 303, the gradient of which corresponds to the second speed.

The electric motor 4 is activated for operation in the first operating state or in the second operating state depending on the item of information relating to the position of the actuating element 6.

The influences of the oscillations on the characteristic curve are avoided owing to the method for calibrating the positioner system 1.

The position of the actuating element 6 can be set by activating the electric motor 4. In this case, the position of the actuating element 6 is preferably changed in the first operating state of the electric motor 4 in a first region. The first region is delimited by a prespecified first stop 320 for the actuating element 6 and a prespecified first position 330 of the actuating element 6, which first position is different from said first stop.

The position of the actuating element 6 is preferably changed in the second operating state of the electric motor 4 in a second region. The second region is delimited by a prespecified second stop 310 for the actuating element 6 and the prespecified first position 330 of the actuating element 6 which is different from said second stop.

In the example, the actuating element 6 is moved to the second stop 310 at the beginning of the method in a preparatory step. The second stop 310 is, for example, the stop of the throttle valve when said throttle valve is completely closed or exhibits its smallest possible opening. This is, for example, the completely closed state of a throttle valve of a motor vehicle. In this case, the prespecified first position 330 is an inoperative position of the throttle valve, for example an emergency-air point. This position is set, for example, by a spring or two springs which hold the throttle valve in an emergency operation position.

For the purpose of actually carrying out the calibration or basic adaptation, the electric motor 4 for example is then first switched to the second operating state. In the process, the actuating element 6 is moved at the first prespecified speed, for example starting from the second stop 310, such that the actuating element 6 is moved from the second stop 310 toward the prespecified first position 330 in the second region, for example to the emergency-air point. As a result, the position of the actuating element 6 in the second region changes. The sensor 7 records the current position of the actuating element 6 and outputs a corresponding output variable. The second operating state is maintained until the second region has been passed through. In the example until the throttle valve reaches the emergency-air position, that is to say the first position 330.

In this case, the actual position of the actuating element 6 and therefore also the output variable of the sensor 7 oscillate, for example, at a first harmonic, that is to say a fundamental frequency, and one or more further harmonics. This results in a superimposed oscillation of the output signal of the sensor 7. This corresponds to the time profile 301, illustrated in FIG. 3, of the position S of the actuating element 6. In this case, the time profile 301 comprises, in the figure, the movement region from the second stop 310, bottom left in FIG. 3, to the first stop 320, top right in FIG. 3.

The position of the actuating element 6 is recorded by the sensor 7, as described above. The electric motor 4 is activated for operation in the first operating state or in the second operating state depending on the recorded position. The activation is performed, for example, in a model-based manner. In the case of the throttle valve, a setpoint position, for example, is prespecified depending on a model which takes into account the electric motor 4, the transmission 5 and a spring constant for the spring 8.

As has been described above, the second, short region can be passed through comparatively slowly, so that the amplitudes of the oscillation are impressed only to a very slight extent. Therefore, for example, the conventional method comprising recording value pairs comprising space vector position and actual position of the actuating element can be used here. The value pairs can be arranged closely or densely in relation to one another in order to in this way create a characteristic curve with enough points in the second region. Owing to the low amplitudes, the ascertained value pairs deviate only slightly from the ideal line, and therefore the characteristic curve cannot be excessively corrupted.

It is then necessary to pass through the first, longer region.

To this end, the electric motor 4 is then switched to the first operating state. In the process, the actuating element 6 is moved at the first prespecified speed, for example greater than the second speed, for example starting from the inoperative position 330 such that the actuating element 6 is moved from the inoperative position 330 toward the first stop 320 in the first region. As a result, the position of the actuating element 6 in the first region changes. The sensor 7 records the current position of the actuating element 6 and outputs a corresponding output variable.

The resulting superimposed oscillation is evaluated by the controller 3, as described above.

The item of information relating to the position of the actuating element 6 is preferably ascertained in at least one prespecified time interval by averaging over several measurement values which were measured in the at least one prespecified time interval.

While the position is changed in the first region, times for recording measurement values by the sensor 7 are preferably provided in at least 50%, preferably at least 60%, of the first region. The interpolation points are preferably arranged in at least 50%, preferably at least 60%, of the first region. A change in the speed can be provided in the region outside the region which is used for determining the characteristic curve.

The error which can be attributed to the influence of the oscillation components is minimized by the described procedure.

The first speed or the second speed is preferably selected to be constant. The speed can also be selected to be increasing or decreasing. Provision is preferably made for a reduction in the first speed or the second speed before the actuating element 6 reaches one of the prespecified stops. In this case, the first speed and the second speed are selected such that the entire actuating region is passed through in the prespecified time. In this case, the first speed is selected to be greater than the second speed. By way of example, an entire actuating region of a throttle valve can be passed through in three seconds.

The order in which the first region or the second region are passed through is fundamentally arbitrary. The measurement can be performed both when the actuating element 6 is moving from the respective stop to the inoperative position or from the inoperative position to the respective stop.

The invention claimed is:

1. A method for calibrating a positioner system having a brushless electric motor configured to influence a position of an actuating element, the method comprising:

recording at least two values of an output variable of a sensor configured to determine a position of the actuating element, the at least two values being recorded at two different times in a first predetermined time interval, a duration of the first predetermined time interval depending on a characteristic of the brushless electric motor;

ascertaining an item of information relating to the position of the actuating element based on the at least two values; and assigning the item of information relating to the position of the actuating element to an item of information relating to a rotor position of a rotor of the brushless electric motor, wherein the duration of the first predetermined time interval depends on wavelength of a periodic oscillation which occurs during activation of the rotor of the brushless electric motor.

2. The method as claimed in claim 1 further comprising:
activating the brushless electric motor at a predetermined first speed that moves the actuating element in a first operating state of the brushless electric motor and at a predetermined second speed that moves the actuating element in a second operating state of the brushless electric motor, the predetermined first speed being higher than the predetermined second speed; and
activating the brushless electric motor to selectively operate in one of the first operating state and the second operating state depending on the item of information relating to the position of the actuating element.

3. The method as claimed in claim 1 further comprising:
ascertaining the item of information relating to the position of the actuating element in at least one second predetermined time interval by averaging over several measurement values which were measured in the at least one second predetermined time interval.

4. The method as claimed in claim 1 further comprising:
activating a rotor of the brushless electric motor at a uniform angular velocity.

5. The method as claimed in claim 2 further comprising:
setting the position of the actuating element by activating the brushless electric motor; and
changing the position of the actuating element, in the first operating state of the brushless electric motor, in a first region which is delimited by a predetermined first stop for the actuating element and a predetermined first position of the actuating element, the predetermined first position being different from the predetermined first stop.

6. The method as claimed in claim 5 further comprising:
providing, while the position of the actuating element is changed in the first region, a plurality of times for recording respective measurement values by the sensor in at least 50% of the first region; and
recording one of the respective measurement values at each of the plurality of times.

7. The method as claimed in claim 5 further comprising:
changing the position of the actuating element, in the second operating state of the brushless electric motor, in a second region which is delimited by a predetermined second stop for the actuating element and the predetermined first position of the actuating element, the predetermined first position being different from the predetermined second stop.

8. The method as claimed in claim 2,
reducing one of the predetermined first speed and the predetermined second speed before the actuating element reaches a predetermined stop.

9. The method as claimed in claim 1, wherein at least one of (i) the first speed is constant in at least 90% of the first region and (ii) the second speed is constant in at least 90% of the second region.

10. The method as claimed in claim 5, wherein the actuating element is a throttle valve, and the predetermined first position of the actuating element is an emergency-air position of the throttle valve.

11. The method as claimed in claim 1, wherein the duration of the first predetermined time interval depends on a duration of an interval of an oscillation of the output variable.

12. A calibration system for a positioner having a brushless electric motor configured to influence a position of an actuating element depending on a predetermined rotor position of the brushless electric motor, the calibration system comprising:
a controller configured to
record at least two values of an output variable of a sensor configured to determine the position of the actuating element, the at least two values being recorded at two different times in a first predetermined time interval, a duration of the first predetermined time interval depending on a characteristic of the brushless electric motor;
ascertain an item of information relating to a position of the actuating element based on the at least two values; and
assign the item of information relating to the position of the actuating element to an item of information relating to a rotor position of the brushless electric motor,
wherein the duration of the first predetermined time interval depends on wavelength of a periodic oscillation which occurs during activation of a rotor of the brushless electric motor.

13. A computer program product for calibrating a positioner system having a brushless electric motor configured to influence a position of an actuating element, which comprises program code which, when executed on a data processing unit, causes the data processing unit to:
record at least two values of an output variable of a sensor configured to determine a position of the actuating element, the at least two values being recorded at two different times in a predetermined time interval, a duration of the predetermined time interval depending on a characteristic of the brushless electric motor;
ascertain an item of information relating to the position of the actuating element based on the at least two values; and
assign the item of information relating to the position of the actuating element to an item of information relating to a rotor position of the brushless electric motor,
wherein the duration of the first predetermined time interval depends on wavelength of a periodic oscillation which occurs during activation of a rotor of the brushless electric motor.

14. The method as claimed in claim 6 further comprising:
providing, while the position of the actuating element is changed in the first region, times for recording measurement values by the sensor in at least 60% of the first region.

15. The method as claimed in claim 11, wherein the duration of the first predetermined time interval is in the range of between 0-200 milliseconds.

* * * * *